United States Patent
Kuroe et al.

(10) Patent No.: US 6,538,843 B1
(45) Date of Patent: Mar. 25, 2003

(54) MAGNETIC HEAD

(75) Inventors: Akio Kuroe, Katano (JP); Sayuri Muramatsu, Hirakata (JP); Hirotsugu Fusayasu, Uji (JP); Akio Murata, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 184 days.

(21) Appl. No.: 09/704,492

(22) Filed: Nov. 2, 2000

(30) Foreign Application Priority Data

Nov. 9, 1999 (JP) ............................................ 11-318606
Nov. 26, 1999 (JP) ............................................ 11-336192

(51) Int. Cl.$^7$ .............................................. G11B 5/127
(52) U.S. Cl. ........................ 360/110; 360/126; 324/249
(58) Field of Search ................................ 324/244, 248, 324/260; 360/110, 126, 324, 324.2, 324.11, 313, 67; G11R 033/02; G11B 5/33

(56) References Cited

U.S. PATENT DOCUMENTS

| | | | | |
|---|---|---|---|---|
| 5,126,907 A | * | 6/1992 | Hamakawa et al. | 360/126 |
| 6,028,748 A | * | 2/2000 | Kuroe et al. | 360/110 |
| 6,069,475 A | * | 5/2000 | Isomura et al. | 324/244 |
| 6,154,348 A | * | 11/2000 | Suzuki | 360/324 |
| 6,181,535 B1 | * | 1/2001 | Araki et al. | 360/324.11 |

FOREIGN PATENT DOCUMENTS

| | | | |
|---|---|---|---|
| EP | 0 498 640 A2 | 8/1992 | |
| EP | 0 498 668 A2 | 8/1992 | |
| EP | 0 502 535 A1 | 9/1992 | |
| GB | 2 058 436 A | 4/1981 | |
| JP | 11213339 A | * 8/1999 | ............ G11B/5/33 |
| JP | 2001034913 A | * 2/2001 | ............ G11B/5/33 |
| JP | 2001331910 A | * 11/2001 | ............ G11B/5/33 |

* cited by examiner

*Primary Examiner*—David Hudspeth
*Assistant Examiner*—Dan I. Davidson
(74) *Attorney, Agent, or Firm*—Akin, Gump, Strauss, Hauer & Feld, L.L.P.

(57) ABSTRACT

In a high-frequency impedance type magnetic head having high impedance and capable of efficiently detecting a change in impedance, an electrically conductive metal film is sandwiched between two soft magnetic films, and the two soft magnetic films form a portion of a magnetic path. The thickness of one soft magnetic film is smaller than the thickness of the other soft magnetic film. The electrically conductive metal thin film has a pair of electrodes at respective ends thereof, to which are connected an oscillator for applying a high frequency carrier signal to the electrodes and a high frequency amplifier having a demodulator circuit. Further, an electrically conductive metal film winding is provided, and a DC current is applied to the electrically conductive metal film winding at the time of reproduction, while on the other hand, a signal current is applied to the electrically conductive metal film winding at the time of recording.

12 Claims, 12 Drawing Sheets

MAGNETIC HEAD

BACKGROUND OF THE INVENTION

The present invention relates to a magnetic head utilizing a magneto-impedance effect by which the impedance of a sensing conductor is varied by application of a magnetic field, and a magnetic recording and reproducing apparatus using the magnetic head.

An example of a magnetic reproducing head in the prior art is described with reference to FIG. 12A, FIG. 12B and FIG. 13. FIG. 12A is a perspective view of a magnetic reproducing head (hereinafter referred to as the MI head) utilizing the magneto-impedance effect (MI effect) in the prior art, described in IEICE Technical Report MR95-80.

In FIG. 12A, a magneto-impedance effect detector (hereinafter referred to as the magnetic detector) in a MI head 61 is configured by placing a thin film sensing conductor 42 of an electrically conductive metal thin film between two soft magnetic cores 46 and 47 each having a width 43 approximately equal to the track width of a magnetic recording medium 53. As shown in an enlarged view of FIG. 12B, the soft magnetic cores 46 and 47 are formed by alternately laminating permalloy films 44 and $SiO_2$ films 45.

When the MI head 61 reproduces a signal magnetization 54 recorded on the magnetic recording medium 53, a high frequency carrier signal in the UHF band is applied from a high frequency oscillator 485 to the thin film sensing conductor 42 through a resistor 49, thereby flowing a high frequency current 50 therethrough. Then, a voltage change caused by the magneto-impedance effect is detected across terminals 51 and 52 connected to respective ends of the thin film sensing conductor 42. The easy magnetization axes of the soft magnetic cores 46 and 47 are initially oriented in a direction parallel to the width direction of the recording track of the magnetic recording medium 53.

When there is no signal magnetization 54 on the magnetic recording medium 53, a voltage of a high frequency carrier signal arises across the terminals 51 and 52, and the voltage value is equal to the product of the high frequency current 50 and the impedance between these terminals 51 and 52 of the thin film sensing conductor 42.

When there is a signal magnetization 54 on the magnetic recording medium 53, the easy magnetization axes of the soft magnetic cores 46 and 47 deviate from their initial direction of orientation because of the presence of the signal magnetization 54. As a result, the impedance across these terminals 51 and 52 of the thin film sensing conductor 42 decreases due to the magneto-impedance effect.

The high frequency carrier signal is amplitude-modulated according to the change in the impedance of the thin film sensing conductor 42 by the signal magnetization 54 on the magnetic recording medium 53, and thereby the signal magnetization 54 is detected. The signal magnetization 54 on the magnetic recording medium 53 can be read out by demodulating the amplitude-modulated signal.

The detection sensitivity of the signal magnetization 54 on the magnetic recording medium 53 based on the magneto-impedance effect is much higher than the detection sensitivity based on the magnetoresistive effect. The MI head utilizing the magneto-impedance effect has the possibility of producing an output about 10 times as high as that of the known giant MR head utilizing magnetic resistance which is in the process of development.

FIG. 13 is a characteristic curve showing the change in the high frequency carrier signal level with respect to the magnetic field applied to the MI head 61. In FIG. 13, the characteristic curve 56 is obtained by setting the frequency of the high frequency carrier signal at 1 GHz and varying the strength of DC magnetic field applied to the MI head 61 placed in the central portion of the known Helmholtz coil.

According to the characteristic curve 56, the rate of change of the high frequency carrier signal level is small at and near the point where the applied magnetic field strength is zero. In order to modulate the high frequency carrier signal with a high degree of modulation with respect to the change in the magnetic field strength and to obtain a high frequency amplitude-modulated signal with a low distortion, it is desirable to give a DC bias magnetic field 55 biasing the magnetic field so as to use the linear portion of the characteristic curve 56. In the above-mentioned MI head, a DC power supply 58 superimposes a DC current on the current of the high frequency carrier signal, in order to produce the DC bias magnetic field 55. By flowing this DC current through the thin film sensing conductor 42, a DC magnetic field is generated to bias the magnetic field.

The change rate of the impedance of the sensing conductor caused by the magneto-impedance effect is proportional to the product of the frequency of the high frequency carrier signal applied to the sensing conductor and the rate of change of the magnetic permeability of the soft magnetic cores. In order to increase in the detection sensitivity by increasing the change rate of the impedance of the sensing conductor, permalloy films 44 having a large permeability change are used for the material of the soft magnetic cores 46 and 47 in the prior art MI head as mentioned above. A laminated film structure consisting of the permalloy films 44 interleaved with insulating $SiO_2$ films 45 is employed in order to suppress eddy currents at high frequencies. Further, the frequency of the high frequency carrier signal is set at several hundred MHz or higher.

BRIEF SUMMARY OF THE INVENTION

Accompanied by the increase of the magnetic recording density, the track width must be made narrower. As the track width becomes narrower, the strength of the signal magnetization decreases. The MI head in the prior art has no sufficient sensitivity with respect to such narrow track. Therefore, an MI head having a higher sensitivity is needed. An object of the present invention is to provide an MI head having a higher sensitivity than that in the prior art.

The MI head utilizing the magneto-impedance effect has a high reproduction sensitivity and is suitable for high density recording media. However, since the MI head is exclusively for reproducing, a separate recording head must be used for recording. Another object of the present invention is to provide a recording and reproducing head by adding a recording capability to a reproducing head utilizing the magneto-impedance effect.

A magnetic head of the present invention comprises: a first, soft magnetic film formed on a non-magnetic substrate; a second soft magnetic film having a thickness smaller than the thickness of the first soft magnetic film, and formed on the substrate in contact with an end portion of the first soft magnetic film; an electrically conductive metal film formed on the second soft magnetic film; a third soft magnetic film having a thickness smaller than the thickness of the first soft magnetic film, and formed on the electrically conductive metal film so that an end portion of the third soft magnetic film contacts the first soft magnetic film; a magnetic path portion of a soft magnetic film formed on the substrate in contact with an end portion of each of the second and third soft magnetic films, and having a thickness greater than the thickness of each of the second and third soft magnetic films; and a return path yoke formed by facing to the magnetic path portion at one end portion thereof with a non-magnetic gap member interposed therebetween, contacting to the first soft magnetic film at the other end portion, and with a center portion thereof separated from the third soft magnetic film by a non-magnetic portion interposed therebetween.

When a high frequency current is passed through the electrically conductive metal film, the impedance of the electrically conductive metal film placed between the second and third soft magnetic films changes due to the magnetic flux passing through the first and second soft magnetic films by an external magnetic field. With this impedance change, the high frequency current is amplitude-modulated. By demodulating the amplitude-modulated current, the external magnetic field can be, detected. In the above configuration, when the second and third soft magnetic films are made thinner than the first soft magnetic film, high density recorded signals can be reproduced with a high sensitivity.

A magnetic head in another aspect of the present invention comprises: a first soft magnetic film formed on a non-magnetic substrate; a second soft magnetic film formed in a region where a portion of the first soft magnetic film has been removed (hereinafter referred to as Z region), and extending over the remaining first soft magnetic film, the second soft magnetic film having a thickness smaller than the thickness of the first soft magnetic film; an electrically conductive metal film formed on the second soft magnetic film within the Z region; a third soft magnetic film formed on the electrically conductive metal film and the second soft magnetic film, and having a thickness smaller than the thickness of the first soft magnetic film; a non-magnetic insulating film as a gap member formed on a portion of the third soft magnetic film; a non-magnetic portion formed on the third soft magnetic film within a portion corresponding to the Z region; and a soft magnetic film as a return path yoke formed on the non-magnetic insulating film, the non-magnetic portion, and the third soft magnetic film.

By removing a part of the first soft magnetic film formed on the substrate, and by forming the second soft magnetic film, the electrically conductive metal film, and the third soft magnetic film in the part, the second and third soft magnetic films are formed so as to put the electrically conductive metal film therebetween. By means of the above-mentioned configuration, an external magnetic field can be detected based on the change in the impedance of the electrically conductive metal film through which a high frequency current passes, caused by the external magnetic field.

A magnetic head fabrication method of the present invention comprises the steps of: forming a first soft magnetic film on a substrate; forming a recessed portion by etching by means of an ion beam or the like a portion of the first soft magnetic film formed on the substrate until a substrate surface is exposed; forming a second soft magnetic film in the recessed portion to a thickness smaller than the thickness of the first magnetic film; forming an electrically conductive metal film on the second soft magnetic film in the recessed portion; and forming a third soft magnetic film on the electrically conductive metal film. In this fabrication method, a portion of the first soft magnetic film formed on the substrate is etched away by means of an ion beam or the like to form a recessed portion, and the magnetic head is obtained by putting the electrically conductive metal film between the second and third magnetic in the recessed portion.

A magnetic head fabrication method in another aspect of the present invention comprises the steps of: forming a first soft magnetic film on a non-magnetic substrate; removing a portion of the first soft magnetic film; forming a second soft magnetic film in a region where the first soft magnetic film has been removed (hereinafter referred to as Z region) and over the remaining first soft magnetic film; forming an electrically conductive metal film on the second soft magnetic film within the Z region; forming a third soft magnetic film on the electrically conductive metal film and the second soft magnetic; forming a non-magnetic insulating film as a gap member on a portion of the third soft magnetic film; forming a non-magnetic portion on the third soft magnetic film within a portion corresponding to the Z region; and forming a soft magnetic film as a return path yoke on the non-magnetic insulating film, the non-magnetic portion, and the third soft magnetic film. With this fabrication method, the magnetic head can be fabricated using thin film deposition technology, and the fabrication cost can be reduced.

A magnetic head in another aspect of the present invention comprises: a first magnetic film formed on a non-magnetic substrate; a second magnetic film formed on the first magnetic film and having a recessed portion ink a part thereof; a third magnetic film formed at least in the recessed portion of the second magnetic film, and having a thickness smaller than the thickness of the second magnetic film; an electrically conductive metal film formed in the recessed portion; a fourth magnetic film formed so as to hold the electrically conductive metal film in cooperation with the third magnetic film; a return path yoke formed with a space to at least the face of the electrically conductive metal film, facing the fourth magnetic film with a predetermined magnetic gap at one end portion, and contacting the fourth magnetic film at the other end, an electrically conductive metal film winding formed passing through the space and to which a recording signal is applied at the time of recording; a high frequency signal generator connected to respective ends of the electrically conductive metal film, for applying a high frequency carrier signal at the time of reproduction; and a high frequency amplifier connected to the respective ends of the electrically conductive metal film, for demodulating a high frequency signal for output at the time of reproduction.

At the time of recording, the magnetic head serves as a recording head by applying a recording signal to the electrically conductive metal film winding. At the time of reproduction, a recorded magnetization is detected as a change in the impedance of the electrically conductive metal film by applying a high frequency carrier signal to the respective ends of the electrically conductive metal film. In this way, the magnetic head of the present invention can be used for both recording and reproducing operations.

A magnetic recording and reproducing apparatus of the present invention comprises: a magnetic recording and reproducing head having a first magnetic film formed on a non-magnetic substrate, a second magnetic film formed on the first magnetic film and having a recessed portion (Z region) in a part thereof, a third magnetic film formed at least in the recessed portion of the second magnetic film and having a thickness smaller than the thickness of the second magnetic film, an electrically conductive metal film formed in the recessed portion, a fourth magnetic film formed so as to hold the electrically conductive metal film in cooperation with the third magnetic film, a return path yoke formed in spaced relation to at least the face of the fourth magnetic film in a region including the electrically conductive metal film, facing the fourth magnetic film with a predetermined magnetic gap at one end portion, and contacting the fourth magnetic film at the other end, an electrically conductive metal film winding formed passing through the space and to which a recording signal is applied at the time of recording, a high frequency signal generator connected to respective ends of the electrically conductive metal film, for applying a high frequency current at the time of reproduction, and a high frequency amplifier connected to the respective ends of the electrically conductive metal film, for demodulating a high frequency signal for output at the time of reproduction; and a recording medium used for recording and reproduction with the magnetic recording and reproducing head.

Since the magnetic recording and reproducing head includes an electrically conductive metal film winding to which the recording signal is applied, the same head can be used for both recording and reproducing operation, and the apparatus can be simplified in construction.

DETAILED DESCRIPTION OF THE INVENTION

Preferred embodiments of the present invention will be described in detail below with reference to FIG. 1 to FIG. 11.

[First Embodiment]

Figure 1:
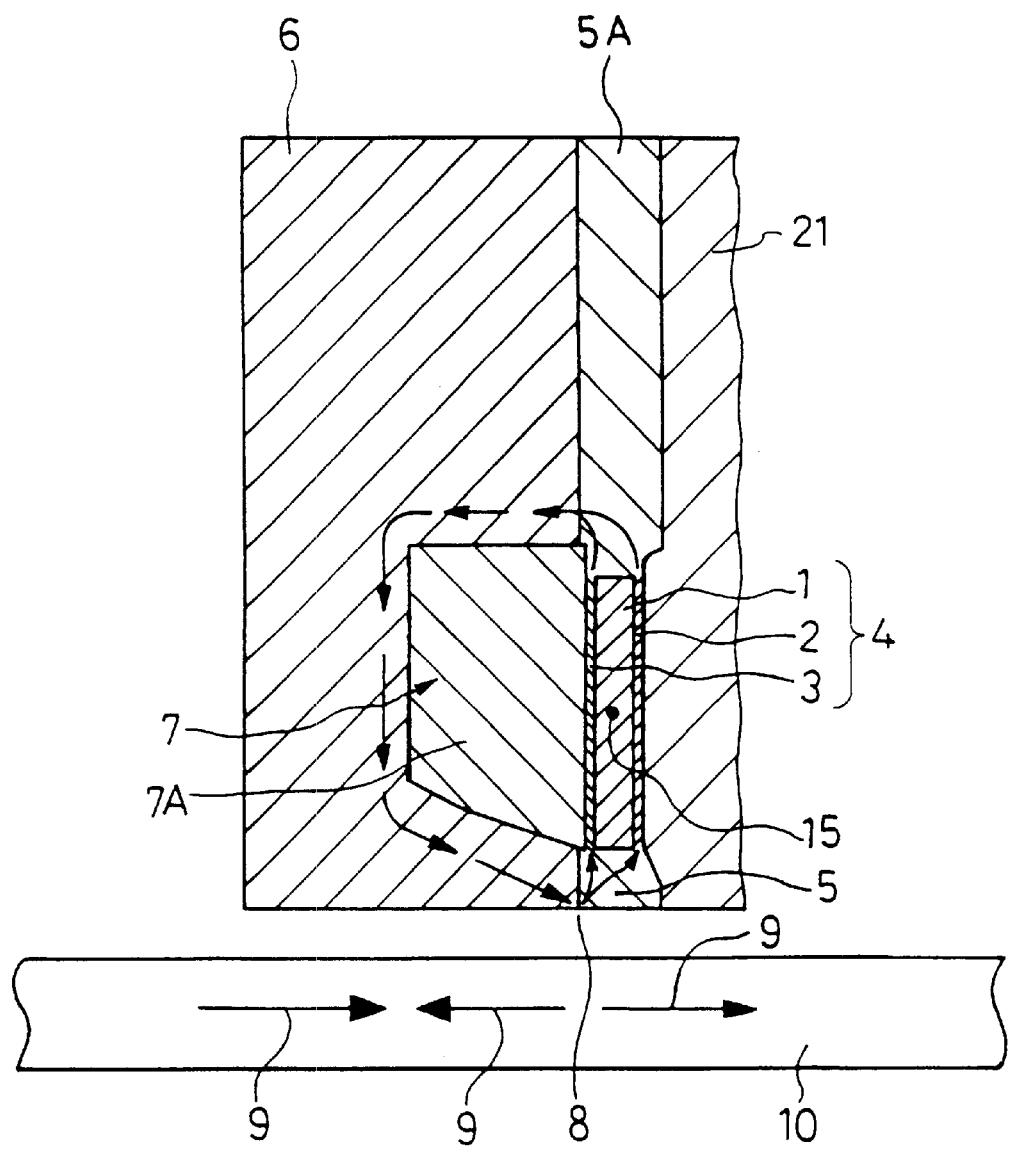
FIG. 1 is a cross-sectional view of a magnetic head according to a first embodiment of the present invention.

FIG. 1 is a cross-sectional view showing the basic configuration of a magnetic head according to a first embodiment of the present invention. In FIG. 1, a first soft magnetic film 5A of an alloy (FeTaN) including iron, tantalum, and nitrogen is formed on top of a non-magnetic ceramic substrate 21 of NiTiMg. A magnetic sensor 4 is formed by putting a electrically conductive metal film 11 of a good conductor such as copper between a second soft magnetic film 2 and a third soft magnetic film 3 of FeTaN which contact one end of the first soft magnetic film 5A. A magnetic path portion 5 of a soft magnetic film of FeTaN is disposed at the lower end of the magnetic sensor 4 in the figure. The magnetic path portion 5 is connected to a return path yoke 6 of a soft magnet FeTaN with an intervenient $SiO_2$ film forming a magnetic gap member 8. The upper end of the magnetic sensor 4 is connected to the return path yoke 6 through the soft magnetic film 5A. The return path yoke 6 is disposed on the soft magnetic film 5A in proximity to the third soft magnetic film 3. A non-magnetic portion 7 is formed in a portion corresponding to the electrically conductive metal film 1. A non-magnetic resist film 7A, for example, is used to form the non-magnetic portion 7. The return path yoke 6 and the magnetic sensor 4 together form a ring-shaped magnetic path encircling the non-magnetic portion 7, thus constructing a ring head type magnetic head.

Figure 2:
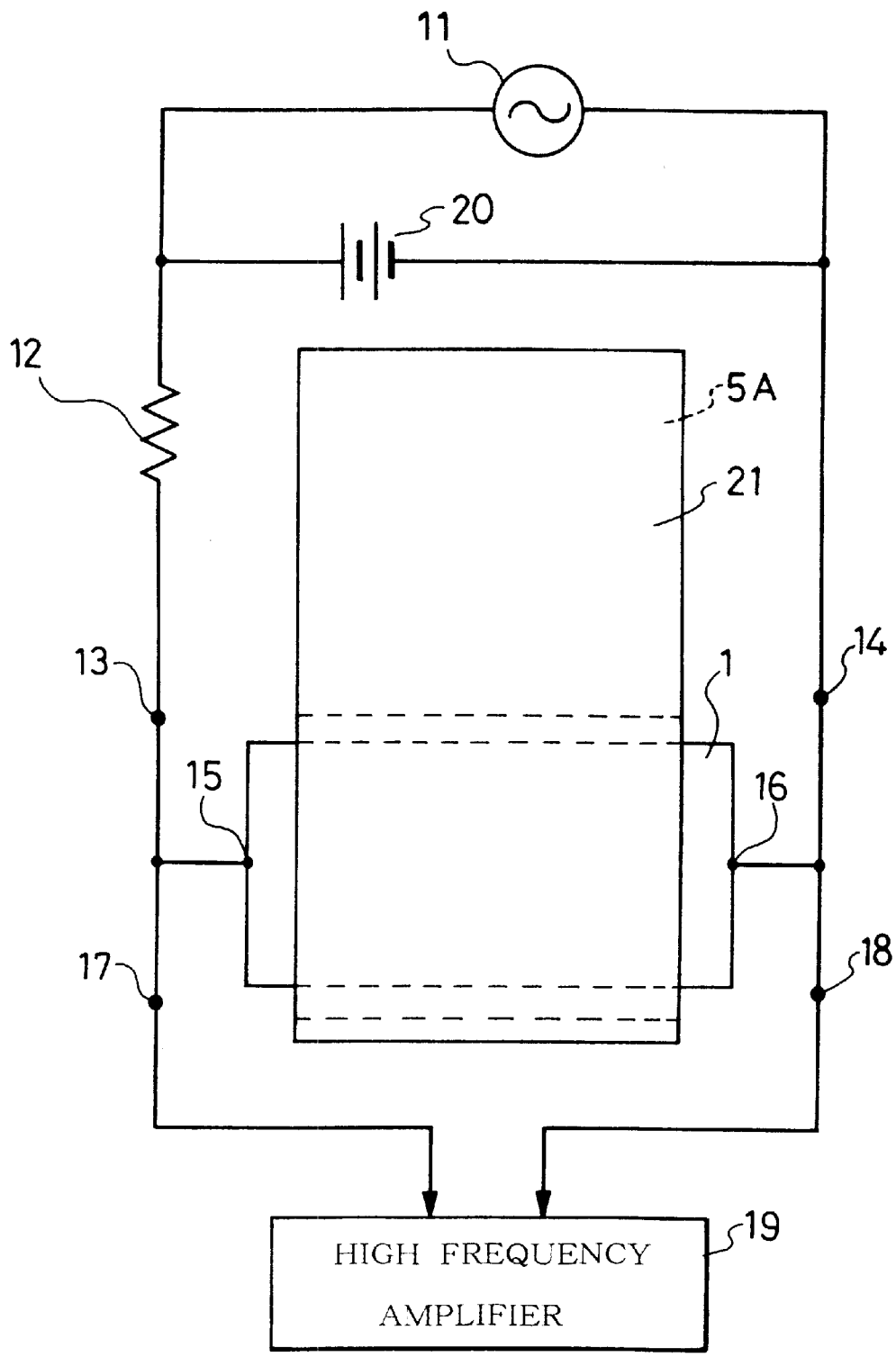
FIG. 2 is a right side view of FIG. 1, showing connections for the magnetic head according to the first embodiment of the present invention.
Figure 3:
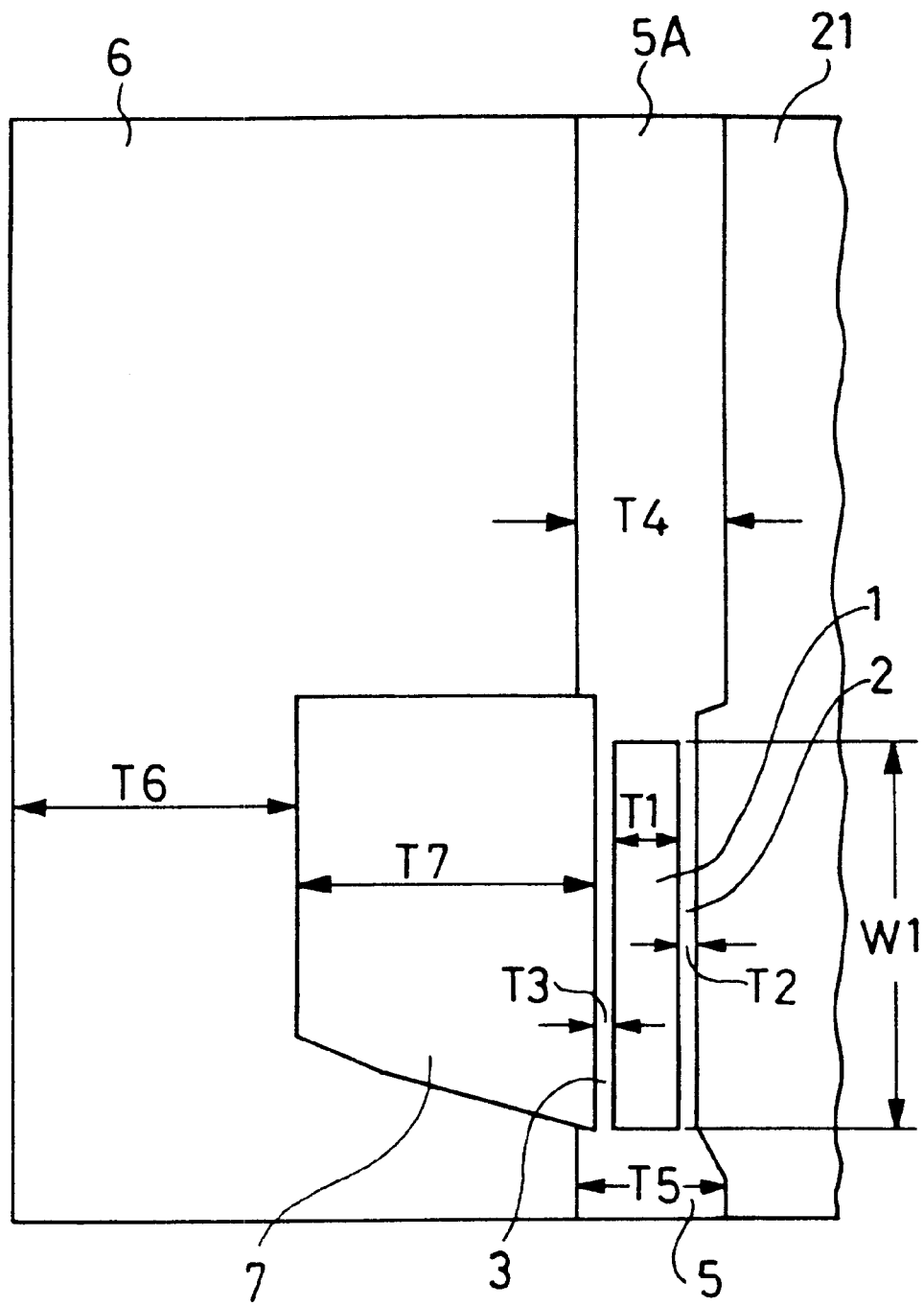
FIG. 3 is a cross-sectional view showing dimensions of relevant parts of the magnetic head according to the first embodiment.

FIG. 2 is a right side view of FIG. 1. In FIG. 2, electrodes 15 and 16 are disposed at respective ends of the electrically conductive metal film 1. A constant current high frequency signal oscillator 11 and DC power supply 20 for generating a bias magnetic field, coupled in parallel to each other, are connected through a resistor 12 to a first pair of electrode terminals 13 and 14 coupled to the electrodes 15 and 16, respectively. A high frequency carrier current (for example, 1 GHz) on which a DC current is superimposed is let to flow through the electrically conductive metal film 1. In this state, when the magnetic head is moved over a magnetic recording medium 10, the magnetic flux generated from the signal magnetization 9 of the magnetic recording medium 10 flows into the magnetic head through the gap member 8. The magnetic flux flows on a closed loop passing through the soft magnetic films 2 and 3 on respective sides of the electrically conductive metal film 1, entering the return path yoke 6 through the soft magnetic film 5A, and returning to the signal magnetization 9 of the magnetic recording medium 10. At this time, permeabilities of the soft magnetic films 2 and 3 at a high frequency change mainly in the vicinity of the electrically conductive metal film 1. As a result, the impedance of the electrically conductive metal film 1 changes due to the MI effect in accordance with the strength of the signal magnetization 9 of the magnetic recording medium 10, and the high frequency carrier current is amplitude-modulated. A signal represented by the amplitude-modulated current is amplified by a high frequency amplifier 19 connected to the electrodes 15 and 16, and the signal magnetization 9 is detected by demodulating the amplified signal. The magnetic path portion 5 serves as a shield core for shielding against magnetic fields generated by magnetizations other than the signal magnetization to be detected FIG. 3 is a cross-sectional view showing the dimensions of the magnetic head in a specific example of the present embodiment.

The thickness T1 of the electrically conductive, metal film 1 is 1 μm to 2 μm, and the width W1 is 4 μm to 6 μm. Preferably, the thickness T1 is 1 μm, and the width W1 is 5 μm. The respective thicknesses T2 and T3 of the soft magnetic films 2 and 3 are 60 nm or less and 40 nm or less, respectively. Preferably, the thickness T2 is 50 nm or less, and T3 is 35 nm or less. The thickness T5 of the magnetic path portion 5 is 1 μm to 3 μm, and preferably 2 μm. The thickness T6 of the return path yoke 6 is 1 μm to 3 μm, and preferably 2 μm. A CoCrPt-based magnetic member of a surface recording density of 20 gigabits per square inch is used as a test magnetic recording medium. A signal magnetization of 0.1 μm of recorded wavelength is prerecorded on the test magnetic recording medium by using an inductive type ring head. The spacing between the magnetic head of this embodiment and the test magnetic recording medium is held to 100 Angstroms, and the signal magnetization is reproduced by the magnetic head of the embodiment.

Figure 4:
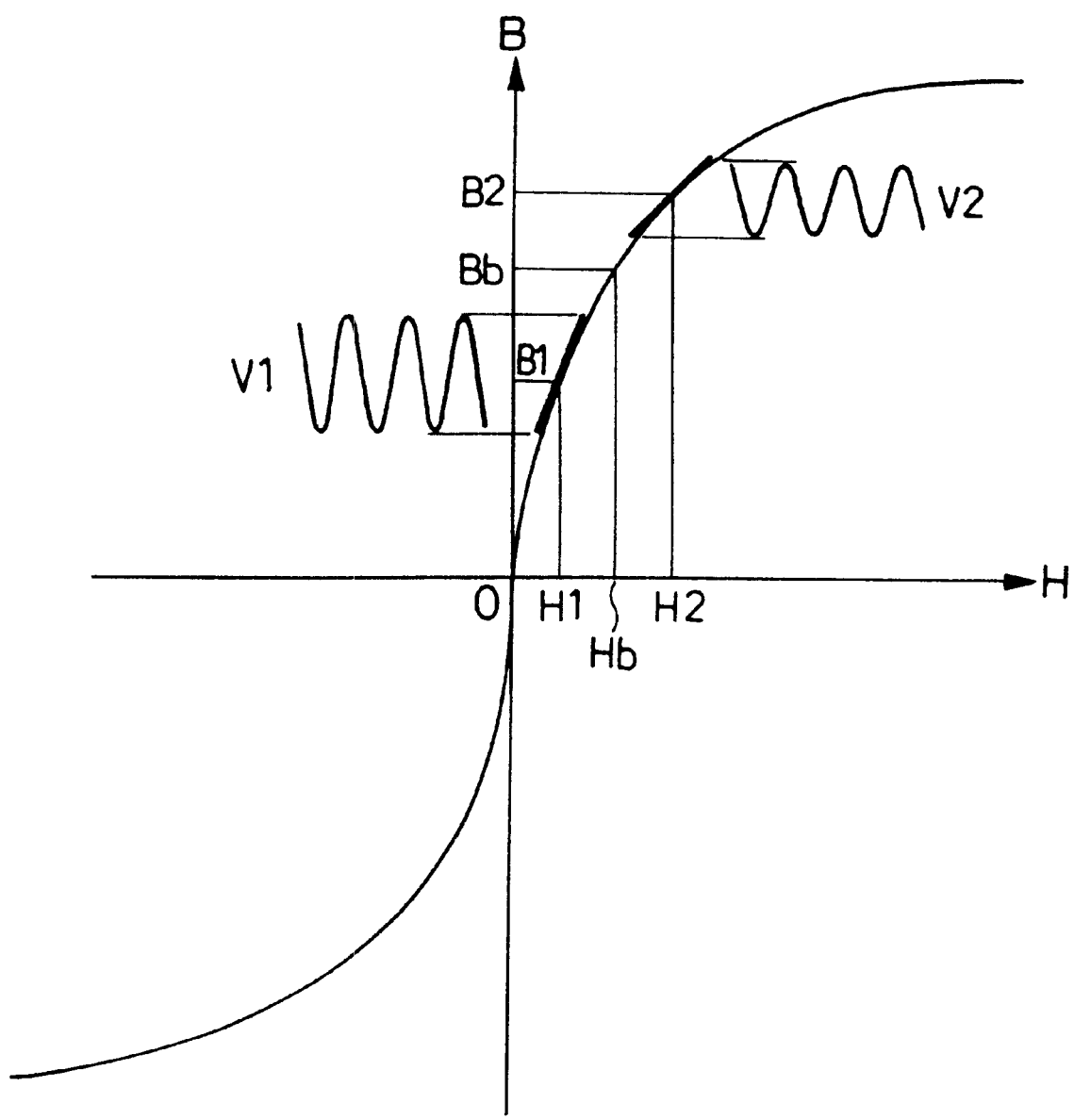
FIG. 4 is a graph showing the relation between signal magnetization strength H and magnetic flux density B in the magnetic head.

FIG. 4 shows the relation between the signal magnetization strength H and the magnetic flux density B produced in the magnetic head by the signal magnetization 9 in consequence of examination of the magnetic head in the specific example. In FIG. 4, abscissa designates the signal magnetization strength H, and ordinate designates the magnetic flux density B in the soft magnetic film 2 of the magnetic head. According to the curve in the figure (hereinafter referred to as H-B curve), the magnetic flux density B increases to a magnetic flux density B2 when the signal magnetization strength H reaches about a signal magnetization strength H2, but beyond that point, the rate of increase of the magnetic flux density B decreases. The DC power supply 20 shown in FIG. 2 gives a bias magnetic field so that the magnetic flux density becomes a magnetic flux density Bb. In this state, when the signal magnetization strength H varies between H1 and H2, the input voltage to the high frequency amplifier 19 varies between voltage V1 and voltage V2, and an amplitude-modulated signal is produced. The input voltage is caused to vary between the voltage V1 and voltage V2 by the following action. With the change of the magnetic flux density B, the directions of the easy magnetization axes of the soft magnetic films 2 and 3 deviate from their initial directions of orientation. Consequently, the permeabilities of the soft magnetic films 2 and 3 change, the impedance of the electrically conductive metal film 1 put between the soft magnetic films 2 and 3 changes, and the high frequency voltage applied from the constant current high frequency oscillator 11 changes. The results of various experiments by the inventors show that the H-B curve of the shape shown in FIG. 4 is obtained when the thickness of each of the soft magnetic films 2 and 3 is set to 60 nm or less. It is desirable that the soft magnetic film 2 is made thicker than the soft magnetic film. 3. It has been confirmed by many experiments that when the thickness of the soft magnetic film 2 is set to 50 nm or less and the thickness of the soft magnetic film 3 to 35 nm or less, the H-B curve of FIG. 4 is obtained and high density signals recorded on magnetic recording media can be reproduced with a high sensitivity. In the H-B curve, it is desirable that the ratio of amplitude change between the voltage V1 and voltage V2 is 10% or larger. When the thicknesses of the soft magnetic films 2 and 3 are respectively set as described above, an amplitude change ratio becomes 10% or larger.

Figure 5A:
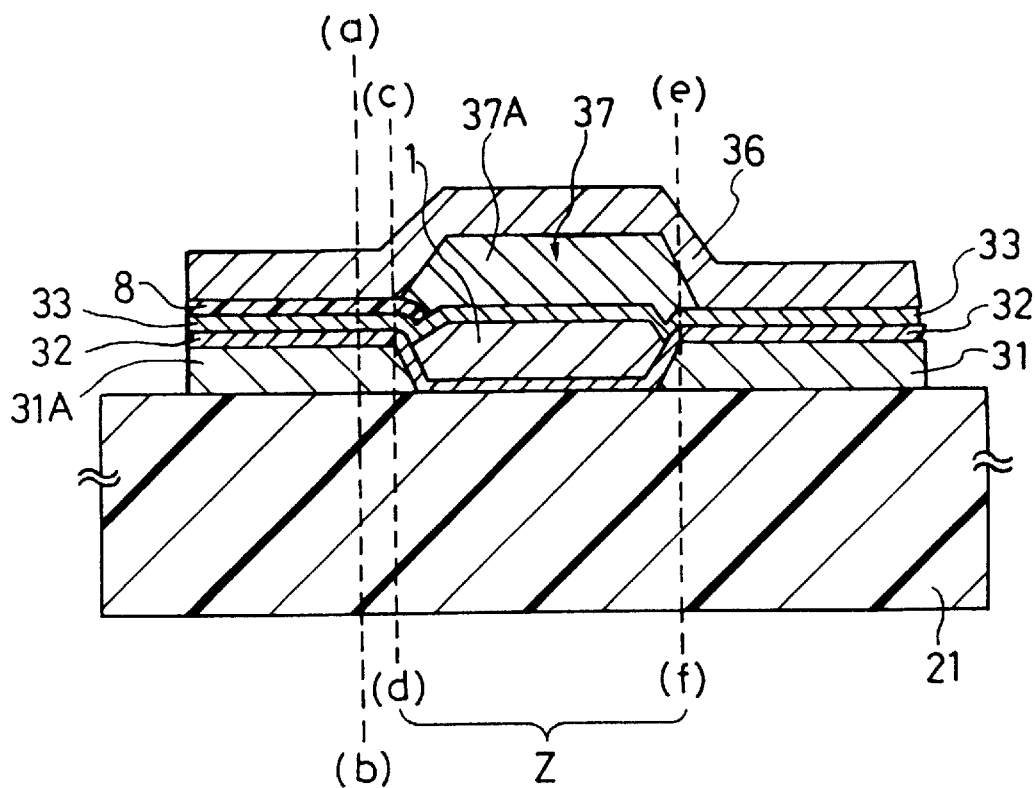
FIG. 5A and FIG. 5B are cross-sectional views of the magnetic head according to the first embodiment of the present invention fabricated by photolithography process.
Figure 5B:
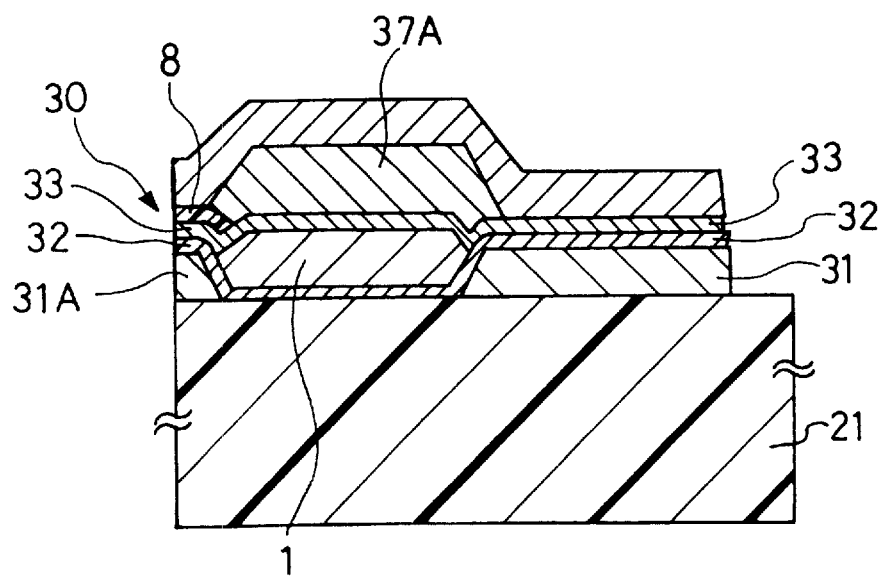

FIG. 5A and FIG. 5B are cross-sectional views illustrating a magnetic head fabrication method of the present invention which uses photolithography and thin film deposition techniques. In FIG. 5A, a first soft magnetic film 31 of the same alloy (FeTaN) as previously described is formed to a thickness of 1 μm on the ceramic substrate 21, and the first soft magnetic film 31 in the region between dashed lines c-d and e-f (hereinafter referred to as Z region) is removed by the ion beam etching process. The remaining left portion of the soft magnetic film 31 becomes a magnetic path portion 31A. Subsequently, by using the same material as the first soft magnetic film 31, a second soft magnetic film 32 thinner than the first soft magnetic film 31 is formed on the first soft magnetic film 331 and the magnetic path portion 31A including, the Z region. The electrically conductive metal film 1 approximately equal to the first soft magnetic film 31 in thickness is formed in the Z region only by using copper (Cu). Then, by using the same alloy as described above, a third soft magnetic film 33 thinner than the first soft magnetic film 31 is formed over the entire surface. On a left side portion of the third soft magnetic film 33 in the figure, an insulating SiO$_2$ film as the gap member 8 is formed to provide a gap in the magnetic head. A thick non-magnetic resist film 37A for forming a non-magnetic portion 37 is formed on the third soft magnetic film 33 above the Z region. Finally, a soft magnetic film which serves as a return path yoke 36 is formed to a thickness of 1 μm. Since the magnetic head can be fabricated using thin film deposition technology, the fabrication cost can be reduced.

The left portion from the dashed line a-b in FIG. 5A is removed by polishing, and the magnetic head having a polished face 30 is completed as shown in FIG. 5B. The polished face 30 is positioned opposite to the magnetic recording medium 10 in recording and reproducing operation.

Figure 6:
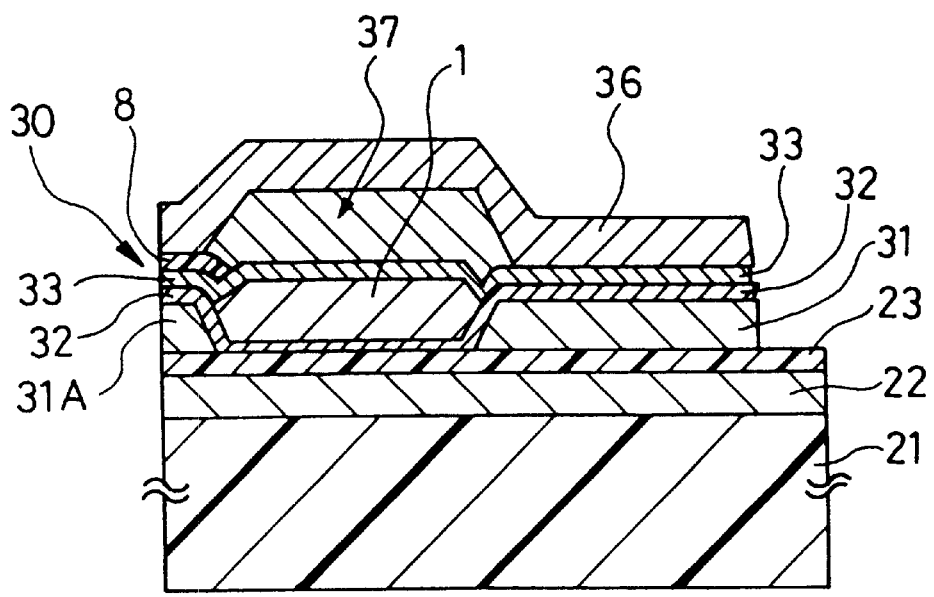
FIG. 6 is a cross-sectional view showing the structure of the magnetic head according to the first embodiment of the present invention improved in heat dissipation.

FIG. 6 is a cross-sectional view showing another structural example of the magnetic head. in the first embodiment. When a high frequency carrier current is passed through the electrically conductive metal film 1, heat is generated. This heat generation causes the temperature rise of the magnetic head, which could cause a change in the magnetic properties. In order to suppress the temperature rise of the magnetic head, a heat conductive metal film 22 is formed on the ceramic substrate 21, and an alumina dielectric film 23 having high heat conductivity is formed on the metal film 22. The elements shown in FIG. 5 are formed on the dielectric film 23. The heat conductive metal film 22 serves to radiate the heat to the ceramic substrate 21, and is effective to suppress the temperature rise of the magnetic head.

Figure 7:
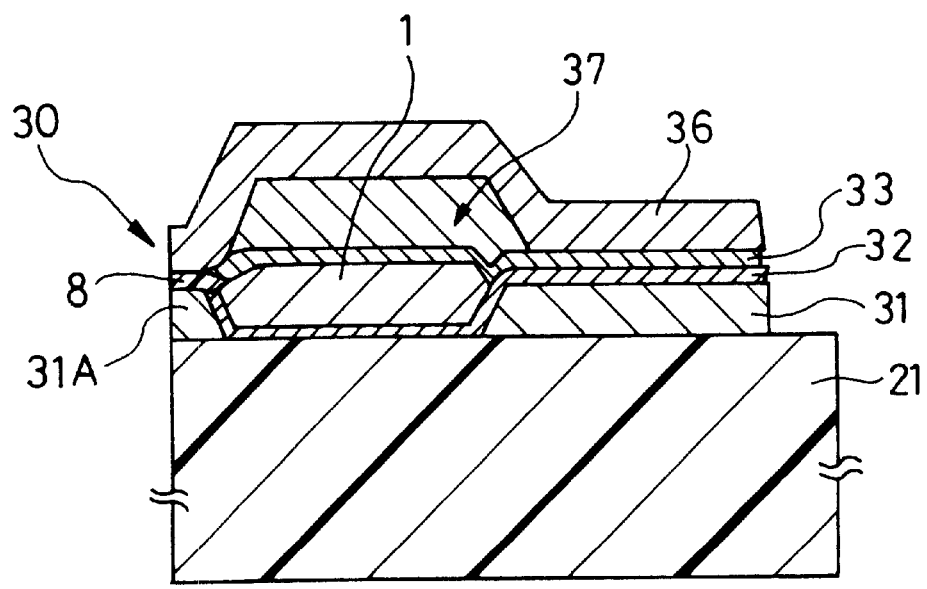
FIG. 7 is a cross-sectional view showing the structure of the magnetic head according to the first embodiment of the present invention improved in resistance to uneven wear.

In the structure of FIG. 5, the SiO$_2$ film as the gap member 8 which is relatively hard and the magnetic path portion 31A are formed so as to put the second soft magnetic film 32 and third soft magnetic film 33 therebetween. In order to obtain a particularly high reproduction sensitivity, there is occasion that the magnetic path portion 31A is formed from FeTaN and the second and third soft magnetic films 32 and 33 are formed from NiFe which is softer than FeTaN. When the magnetic head of this configuration is arranged in opposed relationship to a magnetic recording medium at the polished face 30, and recording or reproducing operation is carried out for a long period of time, the second and third soft magnetic films 32 and 33 abrade greater than the magnetic path portion 31A. Consequently, the second and third soft magnetic films 32 and 33 sink from the polished face 30 and a dent is formed. If minute magnetic particles separated from the magnetic recording medium enter into the dent, the detection sensitivity of the magnetic head would significantly lowers. In order to prevent the defect, as shown in FIG. 7, before forming the gap member 8 of SiO$_2$, the second and third soft magnetic films 32 and 33 are selectively removed by ion beam etching so that the second and third soft magnetic films 32 and 33 will not be exposed in the polished face 30. As a result, only the hard SiO$_2$ film of the gap member 8 and the relatively hard magnetic path portion 31A are exposed on the polished face 30, and the formation of the dent due to wear can be prevented.

[Second Embodiment]

Figure 8:
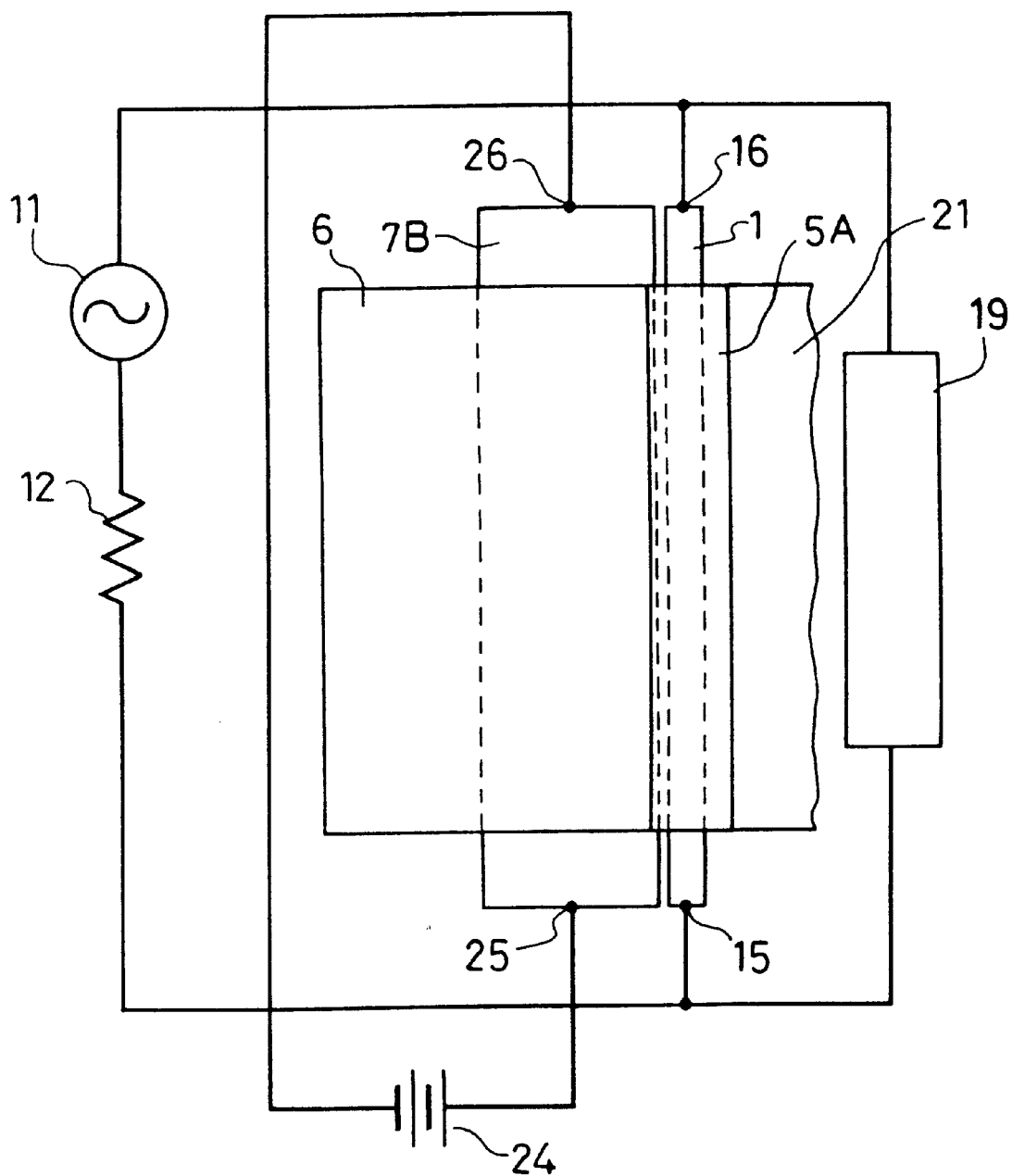
FIG. 8 is a plan view showing connections for a magnetic head according to a second embodiment of the present invention.

A second embodiment of the present invention will be described with reference to FIG. 8. In the magnetic head of the second embodiment, the resist film 7A forming the non-magnetic portion 7 in the configuration of FIG. 1 is replaced by an electrically conductive thin film 7B formed from copper or the like. Remaining configuration is the same as that of FIG. 1. FIG. 8 is a plain view of the magnetic head in FIG. 1, in which the electrically conductive thin film 7B is formed in the non-magnetic portion 7. A DC power supply 24 is connected across electrode terminals 25 and 26 provided at respective ends of the electrically conductive thin film 7B, and a DC bias magnetic field is formed by passing a DC current through the electrically conductive thin film 7B.

In order to increase the sensitivity of the magnetic, head of this embodiment, it will be effective to make the thickness T3 of the soft magnetic film 3 in FIG. 1 and FIG. 3 smaller than the thickness T2 of the soft magnetic film 2. Further, in comparison with the resist film 7A formed from an organic material, the electrically conductive thin film 7B formed for the non-magnetic portion 7 has better heat conductivity, and therefore, facilitates heat dissipation.

In the above-mentioned embodiments, FeTaN has been used for the soft magnetic films 2 and 3, but other magnetic material having excellent effective permeability at high frequencies, such as a Fe-based or Co-based magnetic metal film or a magnetic oxide film, can also be used. Other metal films such as Au, Ag, etc. having low specific resistance can be used as replacement for copper of the electrically conductive metal film. The gap member 8 has been formed from $SiO_2$, but it may be formed from an alumina, glass, or other inorganic dielectric film. For the substrate, a substrate of AlTiC, other ceramic material, glass-based material or even a carbon substrate may be used as replacement for the NiTiMg ceramic substrate. Also, alumina has been used as the dielectric material having high heat conductivity, but other dielectric material may. be used. Furthermore, Au, Ag, brass, or other metal having a high heat conductivity are also usable as replacement for copper for the heat conductive metal film 22.

[Third Embodiment]

Figure 9:
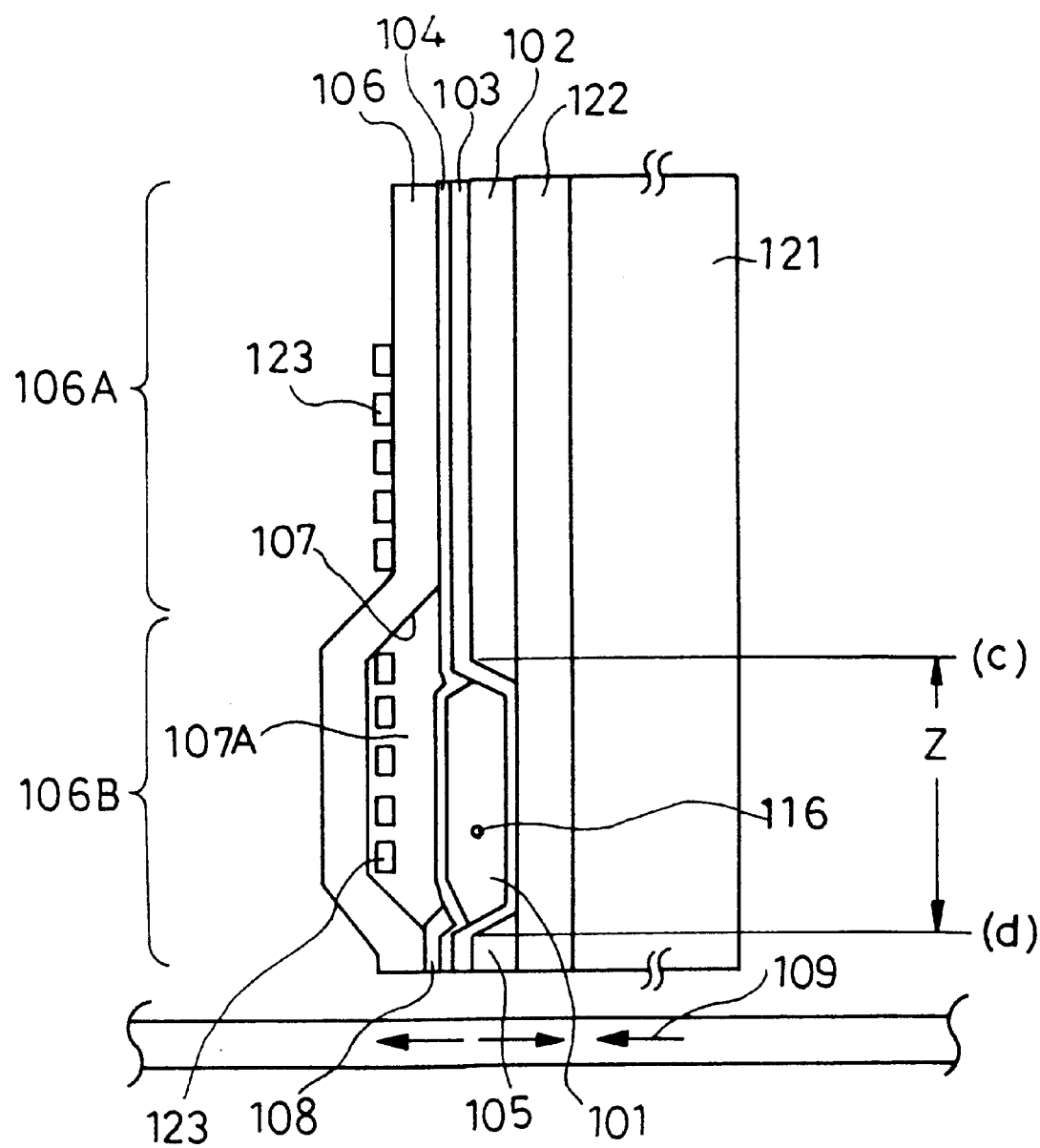
FIG. 9 is a cross-sectional view of a magnetic head according to a third embodiment of the present invention.

FIG. 9 is a cross-sectional view of a magnetic recording and reproducing head of this embodiment fabricated with thin films by using photolithography. As shown in FIG. 9, a first soft magnetic film 122 of amorphous CoNbZr is formed to a thickness of about 1 μm on the surface of a ceramic substrate 121. A second soft magnetic film 102 of FeTaN is formed to a thickness of about 1 μm on the first soft magnetic film 122, and the portion of the second soft magnetic film 102 between horizontal lines (c) and (d) (this portion will hereinafter be referred to as Z region) is removed by ion beam etching, thereby forming a recessed portion. As a result, the second soft magnetic film 102 is divided into two portions, and the lower portion in the figure will be referred to as a soft magnetic film 105. Subsequently, a third soft magnetic film 103 of FeTaN thinner than the second soft magnetic film 102 is formed, for example to a thickness of 50 nm on the second soft magnetic film 102, the soft magnetic film 105 and the Z region. The second and third soft magnetic films 102 and 103 are each selected to have permeability higher than that of the first soft magnetic film 122.

According to experiments conducted by the inventors, it is desirable that the permeability of the first soft magnetic film 122 is selected to be one tenth or less of the permeabilities of the second and third soft magnetic film 102 and 103. On top of the third soft magnetic film 103 in the Z region, an electrically conductive metal film 101 of copper (Cu) or the like is formed to a thickness approximately equal to the thickness of the second soft magnetic film 102. After smoothing the surfaces of the third soft magnetic film 103 and electrically conductive metal film 101, a fourth soft magnetic film 104 of FeTaN is formed over the surfaces so as to put the electrically conductive metal film 101 between the third and fourth soft magnetic films 103 and 104. An MI sensor is formed by the electrically conductive metal film 101 and the third and fourth soft magnetic films 103 and 104. Since the third soft magnetic film 103 is extremely thin, an effect which will be described in detail later is not only obtained, but also surface smoothing process is carried out with a high efficiency. Moreover, irregularity of the surfaces of the various films can be reduced in the subsequent forming steps. Particularly, the fourth soft magnetic film 104 and the return path yoke 106 which are sequentially formed in the later steps can be made without deterioration in the magnetic properties.

Subsequently, an insulating film of $SiO_2$ is formed on the third soft magnetic film 103 in a portion forming a gap 108 of the magnetic head. A non-magnetic resist film 107A is formed on a portion called a "coil window 107" located on the fourth soft magnetic film 104 adjacent to the Z region. An upper half of the return path yoke 106 is formed on a region 106A of the fourth soft magnetic film 104. A spiral winding 123 of an electrically conductive metal film is formed on the return path yoke 106 in the region 106A and in the non-magnetic resist film 107A. Finally, a lower half of the return path yoke 106 is formed in the region 106B on the non-magnetic resist film 107A including the spiral winding 123 so as to be connected to the upper half of the return path yoke 106 at an upper end. The return path yoke 106 is formed by a soft magnetic film of 1 μm thick.

Figure 10:
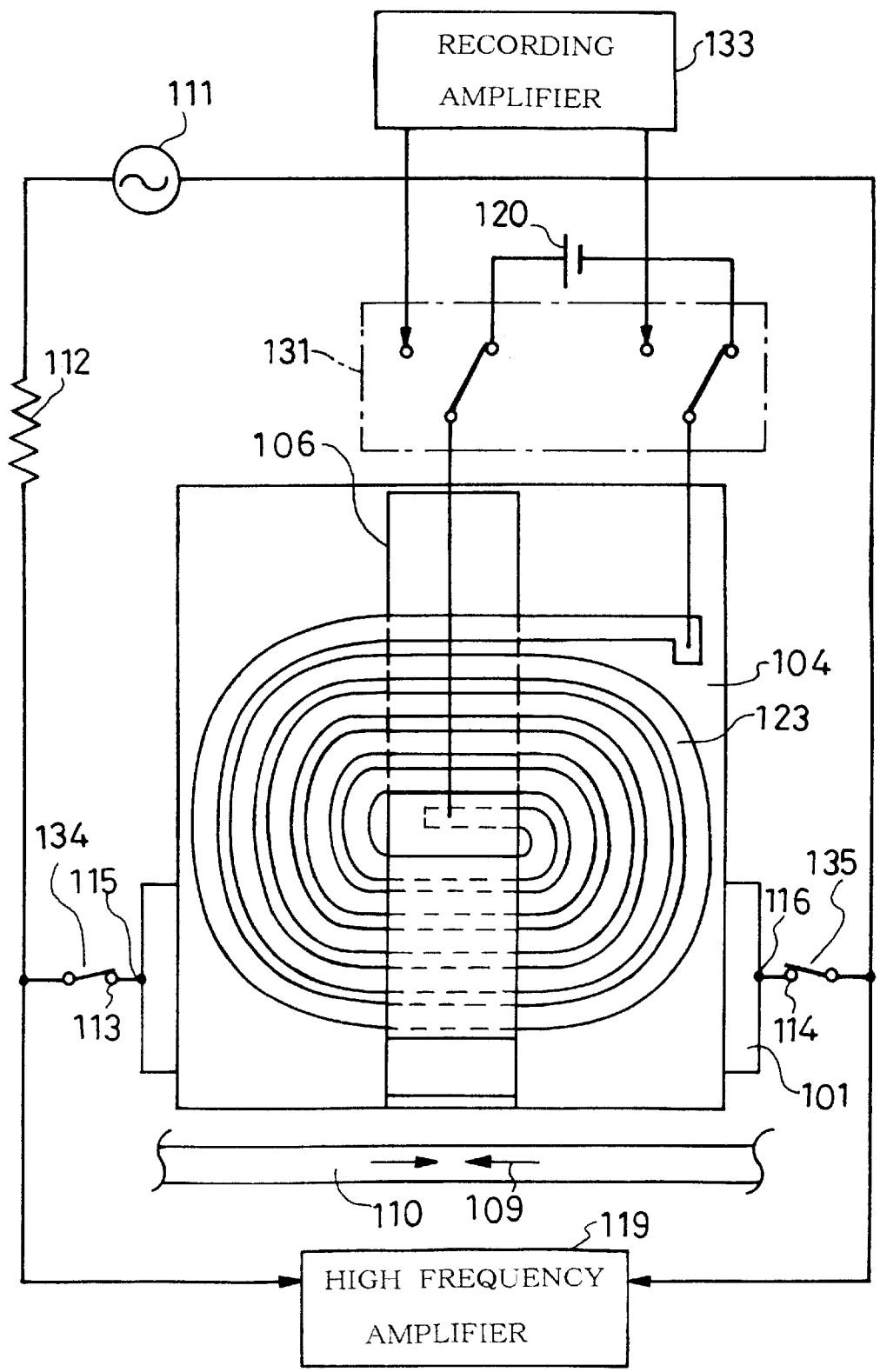
FIG. 10 is a left side view of the magnetic head of FIG. 9.

FIG. 10 is a left side view of the magnetic head in FIG. 9. In FIG. 10, the spiral winding 123 is coupled at respective ends to two common contacts of a selector switch 131. The spiral winding 123 is connected at the time of reproduction to the DC power supply 120 and at the time of recording to a recording amplifier 133 which outputs a recording signal. Electrodes 116 and 115 are provided at respective ends of the electrically conductive metal film 101. The electrode terminals 113 and 114 are connected to the respective electrodes 115 and 16 via connecting lines.

Operation of the magnetic head of this embodiment will be described with reference to FIG. 9 and FIG. 10.

When a recording operation is carried out by using the magnetic head of this embodiment, the selector switch 131 is turned to the left so as to connect the spiral winding 123 to the recording amplifier 133. Furthermore, switches 134 and 135 are opened to disconnect a high frequency oscillator 111 and high frequency amplifier 119 from the electrically conductive metal film 101. When a small recording signal current flows through the spiral winding 123, the magnetic flux passes through the return path yoke 106 through the second and third soft magnetic films 102 and 103, because the permeability of the first soft magnetic film 122 is smaller than the permeability of the second and third soft magnetic films 102 and 103. Consequently, a magnetic field is made in the gap 108. When a large recording signal current flows, the third soft magnetic film 103 saturates because its thickness is extremely small. As a result, the permeability of the third soft magnetic film 103 significantly decreases, and the magnetic flux does not pass through the third soft magnetic film 103 but passes through the first soft magnetic film 122 which is not yet saturated. Since the thickness of the first soft magnetic film 122 is greatly increased compared with the second and third soft magnetic films 102 and 103, the magnetic head does not saturate even when the large recording signal current flows.

When a reproducing operation is carried out by using the magnetic head, the switches 134 and 135 are closed to connect the high frequency amplifier 119 to the electrode terminals 113 and 114, and also connect the high frequency oscillator 111 via a resistor 112, thereby flowing a high frequency current. Furthermore, the switch 131 is turned to the right, and the DC power supply 120 is connected to the spiral winding 123 so as to flow a DC current to the spiral winding 123 and thus apply a DC bias to the magnetic head. In this state, when the magnetic head is positioned on the magnetic recording medium 110, the magnetic flux generated from the signal magnetization 109 on the magnetic recording medium 110 flows into the magnetic head through the gap 108. The magnetic flux flows along a closed loop passing through the third and fourth soft magnetic films 103 and 104 placed on respective sides of the electrically conductive metal film 101, then entering from the upper ends thereof into the return path yoke 106, and finally returning to the signal magnetization 109 on the magnetic recording medium 110. High frequency permeability of the third and fourth soft magnetic films 103 and 104, in particular, in portions surrounding the electrically conductive metal film 101, is changed by the magnetic flux, and the impedance of the electrically conductive metal film 101 changes due to the magneto-impedance effect. As a result, the waveform of the high frequency voltage being applied to the electrically conductive metal film 101 changes according to the strength of the signal magnetic field generated by the signal magnetization 109 on the magnetic recording medium 110, and an amplitude-modulated signal is produced. The high frequency amplifier 119 demodulates and amplifies this amplitude-modulated signal. The soft magnetic film 105 in the lower end portion of the magnetic head serves as a shield core which shields the magnetic head against magnetic fields generated by magnetizations other than the signal magnetization to be detected. It is desirable that the soft magnetic film 105 is formed by a soft magnetic film of thickness 1 $\mu$m to 3 $\mu$m and have as small reluctance as possible.

Figure 11:
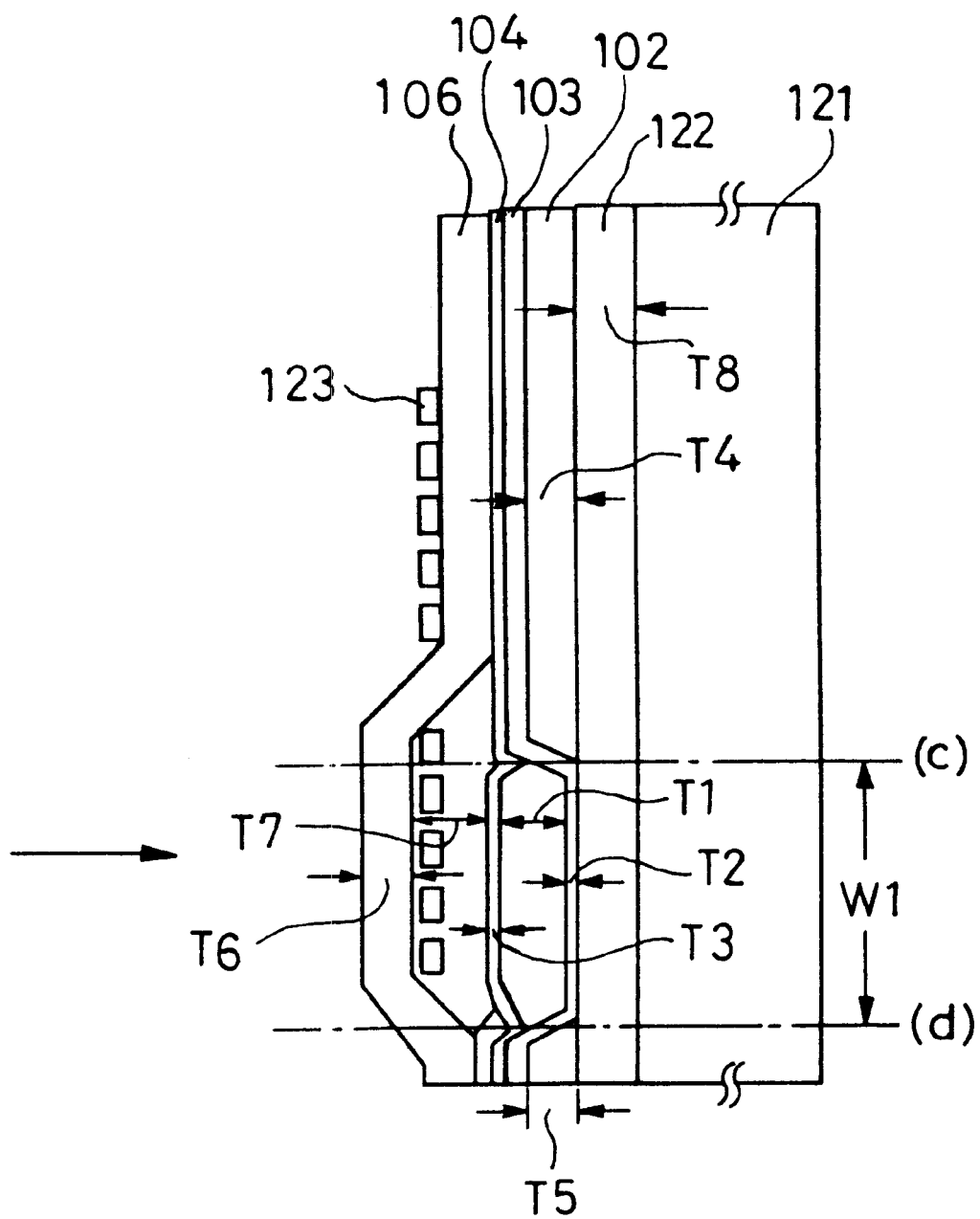
FIG. 11 is a cross-sectional view showing dimensions of relevant parts of the magnetic head according to the third embodiment of the present invention.
Figure 12A:
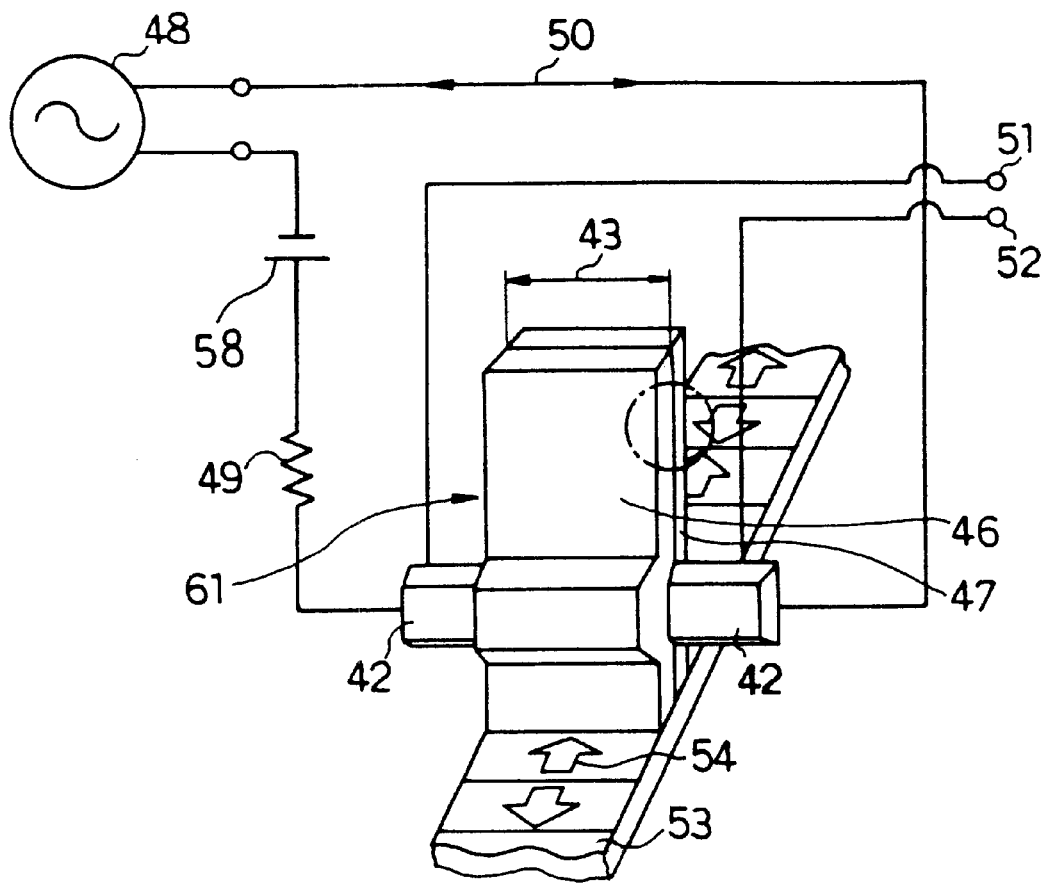
FIG. 12 is a perspective view showing a prior art magneto-impedance head in an operating condition.
Figure 12B:
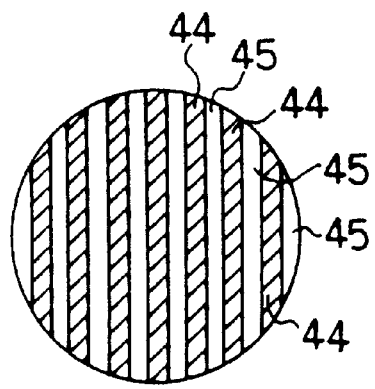
Figure 13:
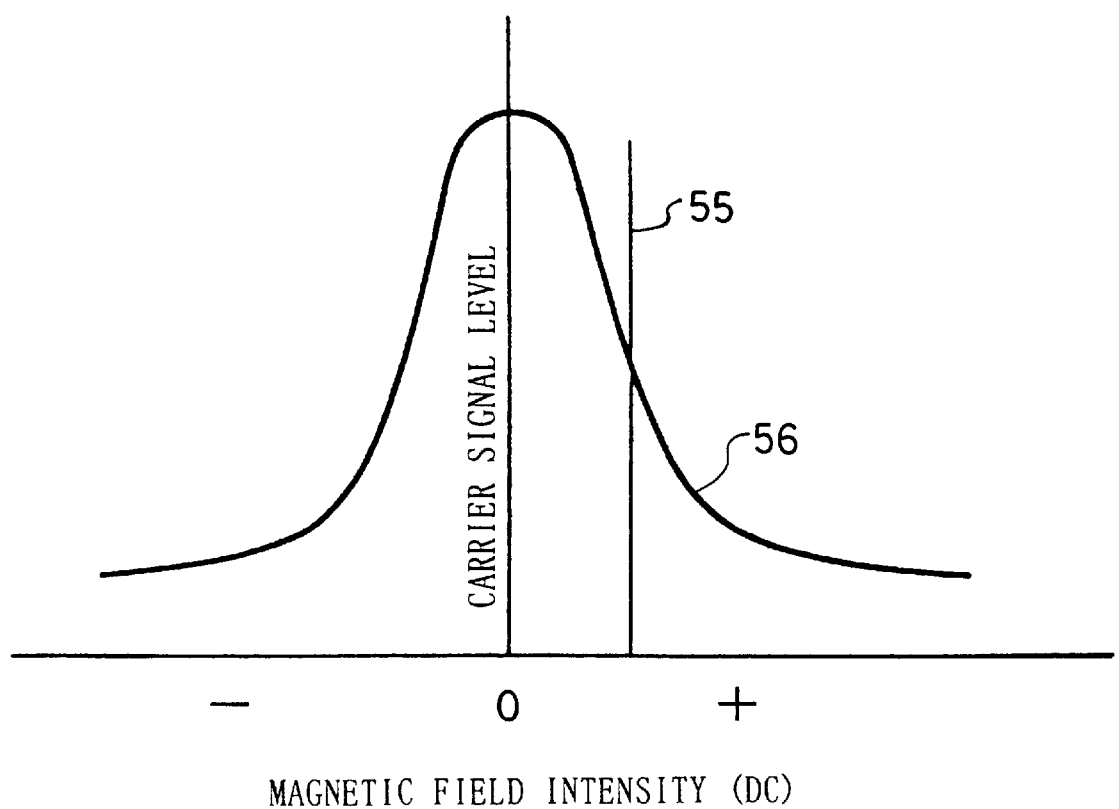
FIG. 13 is a graph showing the relation between magnetic field strength and carrier signal level, illustrating the operation of the prior art magneto-impedance head.

FIG. 11 is a diagram showing preferred dimensions of relevant parts of the magnetic head in a specific example of the third embodiment. The thickness T1 of the electrically conductive metal film 101 is 1 $\mu$m, and the width W1 is 5 $\mu$m. The thicknesses T2 and T3 of the third and fourth soft magnetic films 103 and 104 formed to put the electrically conductive metal film 101 therebetween are 50 nm and 35 nm, respectively. The thickness T5 of the soft magnetic film 105 is 1 $\mu$m, the thickness T7 of the resist film filled into the coil window 107 is 2 $\mu$m, and the thickness T6 of the return path yoke 106 is 2 $\mu$m. A CoCrPt-based magnetic material with a surface recording density of 20 gigabits per square inch is used for the magnetic recording medium 110, and the spacing between the magnetic head and the magnetic recording medium 110 is set at 10 nm. Then, recording and reproduction were performed by using the magnetic head of this embodiment, and the relation between the recorded signal magnetization and the magnetic flux density in the magnetic head was examined.

The graph of FIG. 4 shows the relation between the signal magnetization strength H and the magnetic flux density B produced in the magnetic head by the signal magnetization, which was obtained by examination of the magnetic head of the above-mentioned example. A bias magnetic field was applied by using the DC power supply 120 in FIG. 10 so as to set the magnetic flux density B at Bb. The graph of FIG. 4 shows the result of the examination. The FIG. 4 is used in common with the first embodiment. In FIG. 4, abscissa designates the strength H of the signal magnetization 109, and ordinate designates the magnetic flux density B in the third soft magnetic film 103 of the magnetic head. According to the curve in FIG. 4, the magnetic flux density B increases as shown by B2 until the signal magnetization strength H reaches about H2, but beyond that point, the rate of increase of the magnetic flux density B decreases. In this condition, when the signal magnetization strength H varies between H1 and H2, the input voltage to the high frequency amplifier 119 varies between V1 and V2, and an amplitude-modulated signal is produced. That is, when the signal magnetization having a strength in the range of H1 to H2 is detected, the magnetic flux density B in the magnetic head changes between magnetic flux densities B1 and B2. According to FIG. 4, the reproducing characteristic of the magnetic head in the third embodiment is substantially identical to that of the first embodiment.

The variation of the input voltage between V1 and V2 is caused by the operation described below. When the magnetic flux density B changes, the directions of magnetization of the third and fourth soft magnetic films 103 and 104 deviate from the initially oriented easy magnetization axis direction. Consequently, the permeabilities of the third and fourth soft magnetic films 103 and 104 change, and thereby the impedance of the electrically conductive metal film 101 changes. The high frequency voltage supplied from the constant current high frequency oscillator 111 is changed by the impedance change. According to the results of various experiments conducted by the inventors by using magnetic recording media, in order to realize the operation shown by the B-H, curve of FIG. 4 with a high efficiently, it is desirable that the thickness of each of the third and fourth soft magnetic films 103 and 104 be set to 50 nm or less. In particular, when the thickness of the third soft magnetic film 103 is set to 50 nm or less and the thickness of the fourth soft magnetic film 104 is set to 35 nm or less, thus making the third soft magnetic film 103 thicker than the fourth soft magnetic film 104, a preferable impedance change rate is obtained. In the B-H curve, it is desirable that the rate of amplitude change between the input voltages V1 and V2, that is the impedance change rate, is 10% or larger. When the thicknesses of the third and fourth soft magnetic films 103 and 104 are each set to 50 nm or less as described above, an amplitude change rate of 10% or larger can be obtained.

Soft magnetic films having different permeabilities can be easily fabricated by heat-treating a magnetic film in a magnetic field by varying the magnetic field strength and the temperature. A CoNbZr-based amorphous material is used as the material for the first soft magnetic film 122, but other amorphous material may be used. FeTaN is used for the third and fourth soft magnetic films 103 and 104, but any other magnetic material having excellent effective permeability at high frequencies, such as a Fe-based or Co-based magnetic metal film or a magnetic oxide film, can also be used. Further, copper is used for the electrically conductive metal film, but other metal films made of such as Au, Ag, brass etc. having low specific resistance are also usable. For the dielectric material forming the gap member 108, $SiO_2$ is used in these embodiments, but instead, an alumina, glass, or other inorganic dielectric film may be used. For the substrate 121, a NiTiMg ceramic substrate is used, but a substrate of AlTiC, other ceramic material, glass-based material or even a carbon substrate may be used. Copper has been used for the heat conductive metal film, but it is desirable to use Au, Ag, brass, or other metal having high heat conductivity.

The recording and reproducing heads of the above-mentioned embodiments may be mounted on a known head positioning means and positioned over a known magnetic recording medium such as a magnetic disk. By this configuration, a magnetic recording and reproducing apparatus is achieved by using a single magnetic head. Since the same head can be used for both recording and reproduction, the construction of the apparatus is not only be simplified, but the cost of the apparatus can also be reduced.

What is claimed is:

1. A magnetic head comprising:

a first soft magnetic film formed on a part of a non-magnetic substrate;

a second soft magnetic film having a thickness smaller than the thickness of said first soft magnetic film, said second soft magnetic film being formed on said substrate in contact with an end of said first soft magnetic film;

an electrically conductive metal film formed on said second soft magnetic film;

a third soft magnetic film having a thickness smaller than the thickness of said first soft magnetic film, said third soft magnetic film being formed on said electrically conductive metal film so as to contact said first soft magnetic film at an end of said third soft magnetic film;

a magnetic path portion of a soft magnetic film formed on said substrate in contact with an end of each of said second and third soft magnetic films, said magnetic path portion having a thickness greater than the thickness of each of said second and third soft magnetic films; and a return path yoke facing said magnetic path portion at one end with a non-magnetic gap member interposed therebetween, contacting said first soft magnetic film at the other end, and facing said third soft magnetic film at a central portion with a non-magnetic portion interposed therebetween.

2. A magnetic head comprising:

a first soft magnetic film formed on a part of a non-magnetic substrate;

a second soft magnetic film having a thickness smaller than the thickness of said first soft magnetic film, said second soft magnetic film being formed on said substrate in contact with an end of said first soft magnetic film;

an electrically conductive metal film formed on said second soft magnetic film;

a third soft magnetic film having a thickness smaller than the thickness of said first soft magnetic film, said third soft magnetic film being formed on said electrically conductive metal film so as to contact said first soft magnetic film at an end of said third soft magnetic film;

a magnetic path portion of a soft magnetic film formed on said substrate in contact with an end of each of said second and third soft magnetic films, said magnetic path portion having a thickness greater than the thickness of each of said second and third soft magnetic films;

a return path yoke facing said magnetic path portion with a non-magnetic gap member interposed therebetween, contacting said first soft magnetic film at the other end, and facing said third soft magnetic film at a central portion with a non-magnetic portion interposed therebetween;

a high frequency signal oscillator for supplying a high frequency current to said electrically conductive metal film, said high frequency signal oscillator being connected to respective ends of said electrically conductive metal film;

a DC power supply for supplying a DC current to said electrically conductive metal film for generation of a bias magnetic field, said DC power supply being connected to said respective ends of said electrically conductive metal film; and a high frequency amplifier connected to said respective ends of said electrically conductive metal film.

3. A magnetic head in accordance with claim 1, wherein the thickness of said second soft magnetic film is greater than the thickness of said third soft magnetic film.

4. A magnetic head in accordance with claim 1, wherein a non-magnetic electrically conductive metal film is formed in said non-magnetic portion, and a DC current for a DC bias magnetic field is supplied to said electrically conductive metal film.

5. A magnetic head in accordance with claim 1, wherein copper or other metallic material having high heat conductivity is disposed in said non-magnetic portion.

6. A magnetic head in accordance with claim 1, wherein a heat conductive metal film is formed on said substrate, and said first and second soft magnetic films and said magnetic path portion are formed on said heat conductive metal film with a heat conducting dielectric film interposed therebetween.

7. A magnetic head comprising:

a first soft magnetic film formed on a non-magnetic substrate;

a second soft magnetic film formed in a region where a portion of said first soft magnetic film has been removed (hereinafter referred to as Z region) and on the remaining first soft magnetic film, said second soft magnetic film having a thickness smaller than the thickness of said first soft magnetic film;

an electrically conductive metal film formed on said second soft magnetic film within said Z region;

a third soft magnetic film formed on said electrically conductive metal film and said second soft magnetic film, said third soft magnetic film having a thickness smaller than the thickness of said first soft magnetic film;

a non-magnetic insulating film as a gap member formed on portion of said third soft magnetic film;

a non-magnetic portion formed on said third soft magnetic film within a portion corresponding to said Z region; and a soft magnetic film as a return path yoke formed on said non-magnetic portion and said third soft magnetic film.

8. A magnetic head in accordance with claim 7, wherein said non-magnetic portion formed in the portion corresponding to said Z region is an electrically conductive metal film.

9. A magnetic head in accordance with claim 7, wherein said second soft magnetic film is thicker than said third soft magnetic film.

10. A method for fabricating a magnetic head, comprising the steps of:
   forming a first soft magnetic film on a substrate;
   forming a recessed portion by etching a portion of said first soft magnetic film formed on said substrate until a substrate surface is exposed;
   forming a second soft magnetic film in said recessed portion to a thickness smaller than the thickness of said first magnetic film;
   forming an electrically conductive metal film on said second soft magnetic film in said recessed portion; and
   forming a third soft magnetic film on said electrically conductive metal film.

11. A method for fabricating a magnetic head, comprising the steps of:
   forming a first soft magnetic film on a non-magnetic substrate;
   removing a portion of said first soft magnetic film;
   forming a second soft magnetic film in a region where said first soft magnetic film has been removed (hereinafter referred to as Z region) and on the remaining first soft magnetic film, said second soft magnetic film having a thickness smaller than the thickness of said first soft magnetic film;
   forming an electrically conductive metal film on said second soft magnetic film within said Z region;
   forming a third soft magnetic film on said electrically conductive metal film and said second soft magnetic film, said third soft magnetic film having a thickness smaller than the thickness of said first soft magnetic film;
   forming a non-magnetic insulating film as a gap, member on a portion of said third soft magnetic film;
   forming a non-magnetic portion on said third soft magnetic film within a portion corresponding to said Z region; and
   forming a soft magnetic film as a return path yoke on said non-magnetic insulating film, said non-magnetic portion and said third soft magnetic film.

12. A method for fabricating a magnetic head in accordance with claim 11, wherein
   the thickness of said second soft magnetic film is made greater than the thickness of said third soft magnetic film.

* * * * *